United States Patent [19]

Toye

[11] Patent Number: 5,048,661
[45] Date of Patent: Sep. 17, 1991

[54] CONVEYORS

[75] Inventor: Ronald D. Toye, Kidderminster, United Kingdom

[73] Assignee: Conveyors Ermanco Limited, Stourport-on-Severn, England

[21] Appl. No.: 500,444

[22] Filed: Mar. 28, 1990

[30] Foreign Application Priority Data

Oct. 14, 1989 [GB] United Kingdom ............. 8923188

[51] Int. Cl.$^5$ ............................................ B65G 13/00
[52] U.S. Cl. ................................. 193/35 R; 193/37; 403/348; 384/537; 384/584; 384/439
[58] Field of Search ............... 193/35 R, 37; 384/537, 384/584, 439; 403/348, 349

[56] References Cited

U.S. PATENT DOCUMENTS

| | | | |
|---|---|---|---|
| 2,219,907 | 10/1940 | Ross | 430/349 X |
| 3,751,122 | 8/1973 | Dubay | 193/35 R X |
| 4,056,180 | 11/1977 | Gunti | |
| 4,148,386 | 4/1979 | Bradbury | |
| 4,311,226 | 1/1982 | Thompson et al. | 193/35 R |
| 4,366,894 | 1/1983 | Huelster | |
| 4,444,301 | 4/1984 | Granberry | 193/35 R |
| 4,681,215 | 7/1987 | Martin | |
| 4,756,638 | 7/1988 | Neyret | 403/349 X |

FOREIGN PATENT DOCUMENTS

A20061893 10/1982 European Pat. Off. .
A1327334 4/1963 France .
A2101061 1/1983 United Kingdom .

Primary Examiner—Joseph E. Valenza
Assistant Examiner—Keith L. Dixon
Attorney, Agent, or Firm—Skjerven, Morrill, MacPherson, Franklin & Friel

[57] ABSTRACT

A conveyor apparatus comprising a conveyor of the kind specified having a conveyor frame of the kind specified wherein the spindle of at least one of the rollers comprises a pair of stub spindles each having a generally elongate end portion which in use, extends within a socket provided at one end of the roller, and a support portion which inter-engages with an opening of a respective side frame member of the conveyor frame which provides a mounting frame for the roller, the support portion of at least one of the stub spindles and its associated opening being configured such that with the stub spindle in a first orientation a retaining part of the support portion can be inserted into the opening by moving the stub spindle along the longitudinal axis of the end portion, and when the orientation of the stub spindle is changed to a second orientation, the retaining part of the support portion is prevented from being withdrawn from the opening by an opposite movement of the stub spindle.

16 Claims, 3 Drawing Sheets

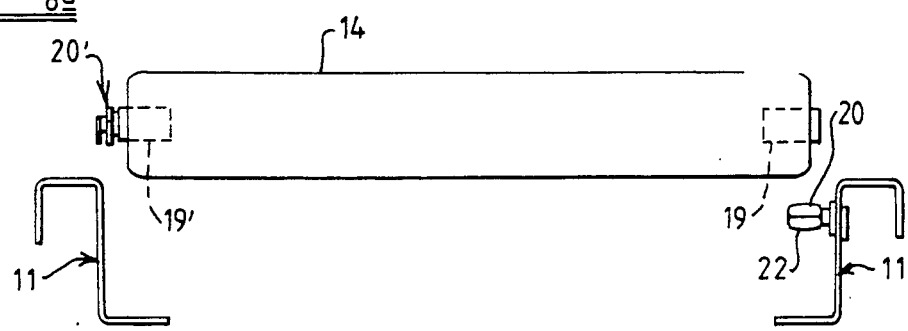
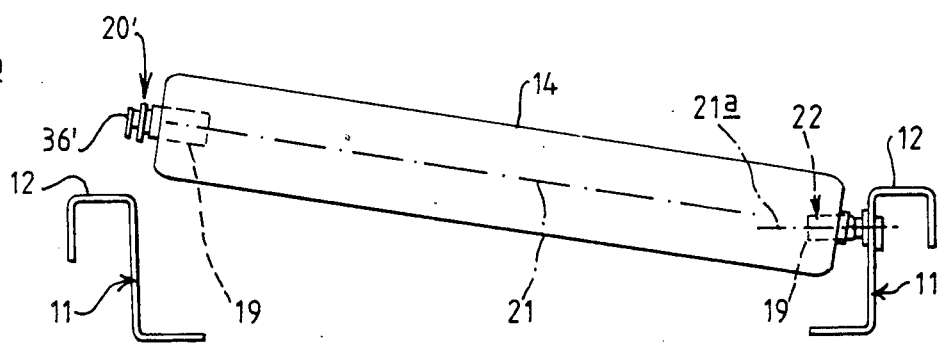
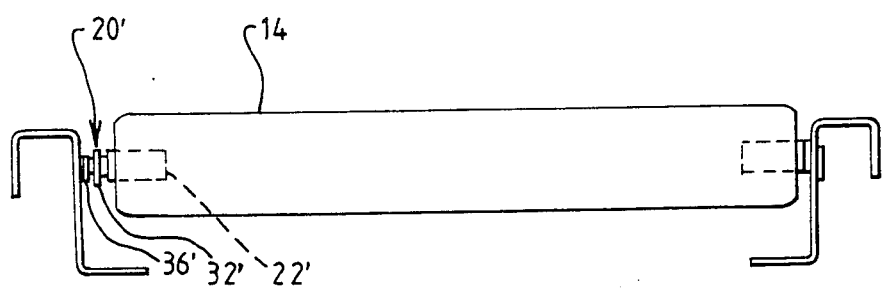
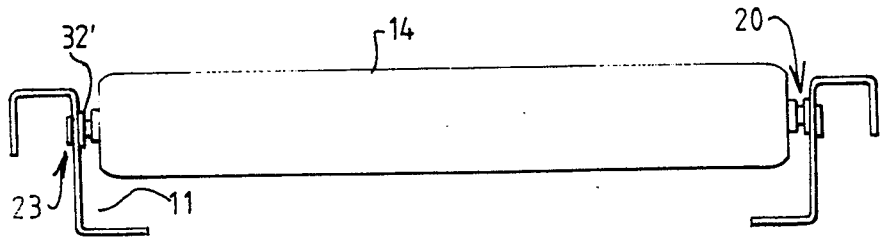

CONVEYORS

BACKGROUND OF THE INVENTION

This invention relates to a conveyor hereinafter referred to as being a conveyor "of the kind specified" having a conveyor frame hereinafter referred to as a "conveyor frame of the kind specified" comprising a pair of spaced side members each having a plurality of mounting means to mount a plurality of rollers in spaced relation between the side members, the conveyor further comprising a plurality of rollers mounted between the side members, each roller being provided with a bearing means having a socket, the rollers being mounted in spaced relation between the pair of side members on spindle means which are carried by the mounting means and which are provided with a portion which extends within the socket to permit each roller to rotate about a roller axis.

In a conveyor of the kind specified, the rollers may be free running or driven. Articles may be placed directly on the conveyor rollers or on an endless conveyor belt which extends around the rollers to provide a greater support area for articles, in a known manner. Such conveyors may extend horizontally or may be inclined.

SUMMARY OF THE INVENTION

According to a first aspect of the invention we provide a conveyor apparatus comprising a conveyor of the kind specified having a conveyor frame of the kind specified wherein the spindle means of at least one of the rollers comprises a pair of stub spindles each having a generally elongate end portion which in use, extends within a socket provided at one end of the roller, and a support portion which inter-engages with an opening of a respective side frame member of the conveyor frame which provides a mounting means for the roller, the support portion of at least one of the stub spindles and its associated opening being configured such that with the stub spindle in a first orientation a retaining part of the support portion can be inserted into the opening by moving the stub spindle along the longitudinal axis of the end portion, and when the orientation of the stub spindle is changed to a second orientation, the retaining part of the support portion is prevented from being withdrawn from the opening by an opposite movement of the stub spindle.

According to a second aspect of the invention we provide a conveyor apparatus comprising a conveyor frame of the kind specified and (a) a first plurality of rollers each having a bearing means providing a socket at each end, a pair of stub spindles for each roller of said first plurality, each stub spindle having an end portion which is adapted to extend within an associated socket to inter-engage therewith and a support portion adapted to inter-engage with a mounting means of an associated frame member to inter-engage therewith to prevent relative rotation therebetween, at least one of the stub spindles and its associated opening being configured such that with the stub spindle in a first orientation a retaining part of the support portion can be inserted into the opening by moving the stub spindle along the longitudinal axis of the end portion, and when the orientation of the stub spindle is changed to a second orientation, the retaining part of the support portion is prevented from being withdrawn from the opening by an opposite movement of the stub spindle;

(b) a second plurality of rollers each having a bearing means providing a socket, an elongate spindle element for each roller of said second plurality, each spindle element having a portion which is adapted to extend within an associated socket to inter-engage therewith and, at opposite ends, support portions adapted to inter-engage with the same mounting means as are inter-engageable with said support portions of the stub spindles, to inter-engage with said mounting means to prevent relative rotation therebetween.

Utilising the invention, the stub spindle can be mounted in the opening in the respective side member from a position between the pair of side members.

The support portion may comprise a flange, and an intermediate portion between the retaining part and the flange, the flange being configured such that the flange cannot pass into the opening in the respective side member with the stub spindle in the first or second orientations.

The intermediate portion and the opening are preferably adapted to co-operate in use of the conveyor to prevent relative rotation between the stub spindle and the side member.

For example, the opening may have a plurality of sides and the intermediate portion of the support portion may have a pair of sides which co-operate with at least some of the sides of the opening to prevent relative rotation between the stub spindle and the side member when in use.

Although the intermediate portion may be of any polygonal shape, preferably the intermediate portion is generally hexagonal in cross section.

The opening in the side member may be generally triangular with an apex of the triangle pointing generally upwardly. Preferably the apices of the triangle are all rounded.

Thus if desired, in a conveyor frame of the kind specified of a conveyor in accordance with the invention a conventional spindle which is hexagonal in cross section and extends from one side frame to the other, may be mounted by the mounting means, with an end of the spindle received in the opening in the side member.

Conveniently, to change the orientation of the stub spindle from the first to the second orientation, the stub spindle is rotated through less than 360° more preferably through 180°, and yet more preferably through less than 90°, and yet even more preferably through about 60°.

At least the intermediate portion of the stub spindle may be made of a material which yields, or in a configuration such that the intermediate portion deforms sufficiently to permit the rotation relative to the opening in the side member, and then regains its shape at least sufficiently to co-operate with the opening to prevent relative rotation in use.

If desired, the end portion of the of the stub spindle and the associated socket of the roller are adapted to inter-engage to prevent relative rotation therebetween.

The end portion of the stub spindle may be polygonal in cross section over at least part of its length and the socket of the roller may be generally prism shaped having a cross section which corresponds to the maximum cross section of the end portion or polygonal part of the end portion.

The end portion may be generally hexagonal in cross section.

If desired, the end portion may be generally barrel shaped, as hereindefined, by which we mean, a shape which is symmetrical about its axis and bulges in a medial region. For example, the end portion of the spindle may be symmetrical about its axis and have an enveloping surface of generally part prolate spheroid shape and preferably bounded by edges which lie in planes normal to the longitudinal axis of the end portion.

Preferably both of the stub spindles of the roller and their associated openings in the pair of side frame members are similarly constructed.

Any number of the rollers of the conveyor may be mounted by stub spindles as desired.

According to a third aspect of the invention we provide a method of making a conveyor according to the first aspect of the invention comprising the steps of taking the conveyor frame and the pair of stub spindles, inserting the retaining part of the support portion of the at least one stub spindle into the corresponding opening of the side frame member, by moving the stub spindle along the longitudinal axis of the end portion thereof with the stub spindle in a first orientation, and changing the orientation of the stub spindle to a second orientation.

The method may include the step of inserting the second of the stub spindles into the respective other socket in the end of the roller, and manoeuvring the roller so as to inter-engage the first mentioned socket and the stub spindle which is already mounted with respect to the conveyor frame, and inter-engaging the support portion of the second of the stub spindles and the mounting means of the other side frame member.

The mounting means of the other side frame member may comprise an opening and the second of the stub spindles may be aligned with the opening of the other sub frame member and the roller moved longitudinally away from the first of the stub spindles so as to engage the support portion of the second of the stub spindles in the opening, to mount the second end of the roller in the conveyor frame.

According to a fourth aspect of the present invention we provide a method of making a conveyor of the kind specified comprising the steps of taking a conveyor frame of the kind specified, and selecting either (a) a first plurality of rollers each having a bearing means providing a socket at each end, a pair of stub spindles for each roller of said first plurality, each stub spindle having an end portion which is adapted to extend within an associated socket to inter-engage therewith and a support portion adapted to inter-engage with a mounting means of an associated frame member to inter-engage therewith to prevent relative rotation therebetween, at least one of the stub spindles and its associated opening being configured such that with the stub spindle in a first orientation a retaining part of the support portion can be inserted into the opening by moving the stub spindle along the longitudinal axis of the end portion, and when the orientation of the stub spindle is changed to a second orientation, the retaining part of the support portion is prevented from being withdrawn from the opening by an opposite movement of the stub spindle, or (b) a second plurality of rollers, each having a bearing means providing a socket, an elongate spindle element for each roller of said second plurality, each spindle element having a portion which is adapted to extend within an associated socket to inter-engage therewith and, at opposite ends, support portions adapted to inter-engage with the same mounting means as are inter-engageable with said support portions of the stub spindles to inter-engage with said mounting means to prevent relative rotation therebetween and engaging the support portions of the selected plurality of rollers with said mounting means to mount the rollers of the selected plurality in spaced relation between said pair of side members.

BRIEF DESCRIPTION OF THE DRAWINGS

The invention will now be described with reference to the accompanying drawings in which:

FIGS. 8a to 8d are illustrative views showing how a roller is engaged with mounting means of the conveyor of FIG. 1.

DESCRIPTION OF THE PREFERRED EMBODIMENTS

Figure 1:
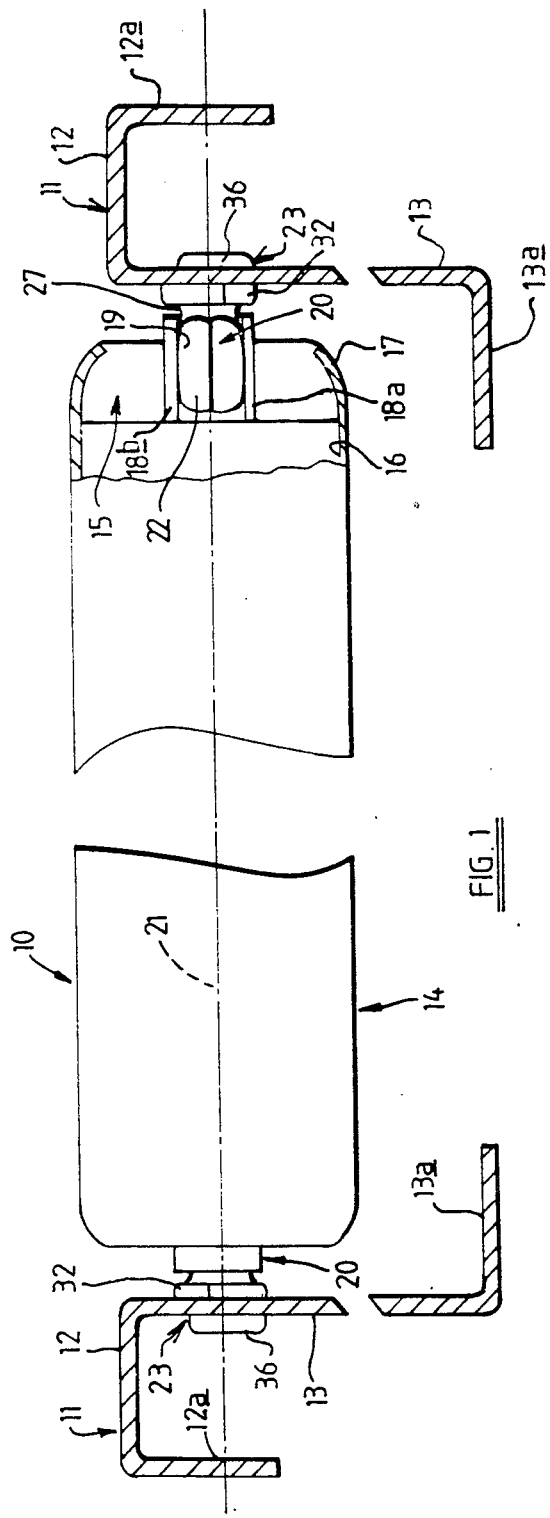
FIG. 1 is a transverse cross section through a conveyor embodying the invention, only part of a roller being shown in cross section.

Referring to the drawings, a conveyor 10 comprises a pair of side members 11 each being of substantially Z shape in cross section and comprising a top flange 12 from which depends a generally vertical lip 12a, an upright 13, from which extends generally horizontally a lip 13a.

The side frame members 11 are maintained in spaced parallel relationship by cross braces which are not shown.

The side frame members 11 are normally carried by upstanding supports (not shown) from a foundation.

Extending between the side frame members 11 are a plurality of rollers 14. Each roller in the present example has a bearing 15 mounted in a bore 16 in each end of the roller 14 by swaging a respective end part 17 of the roller 14 inwardly around an outer race 18a of the bearing 15.

Each bearing has an inner race 18b provided with a socket 19 which, in the present example, is of hexagonal cross sectional configuration, but could be of another generally prism shape.

Received within each socket 19 is an end portion 22 of a stub spindle 20 to mount the rollers 14 for rotation about a respective roller axis 21.

Each stub spindle 20 is a one piece member preferably made as a moulding, for example, in nylon or like material, and comprising an end portion 22 and a support portion 23.

The end portion 22 is barrel shaped, and hexagonal in cross section. Accordingly the end portion 22 comprises six identical intersecting surfaces 24 each of which is convexly curved in a radial plane containing a longitudinal axis 21a of the end portion 22 which axis 21a in use, is generally aligned with the roller axis 21.

The surfaces 24 intersect along curved lines 25 which in the present example are sectors of a circle, but which may be of any other desired convex shape and for example may be part of an elipse, but in each case, the surfaces 25 are in contact with a conceptual enveloping surface of generally part prolate spheroidal shape.

The outer end of the end portion 22 comprises a radial surface 26 whilst at the inner end of the end portion 22 there is provided a neck 27 which connects the end portion 22 to the support portion 23.

Figure 3:
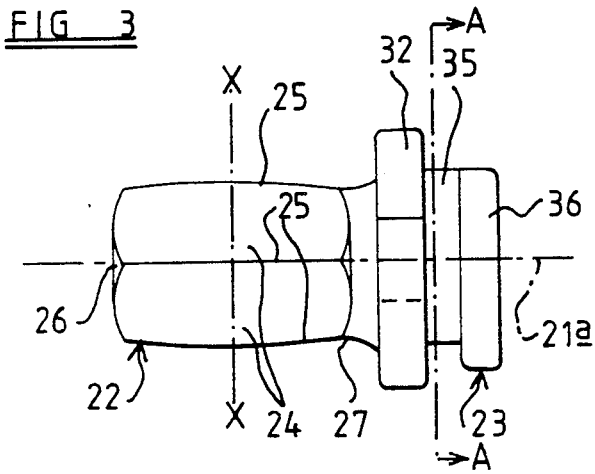
FIG. 3 is a side elevation of a stub spindle of the conveyor of FIGS. 1 and 2.
Figure 4:
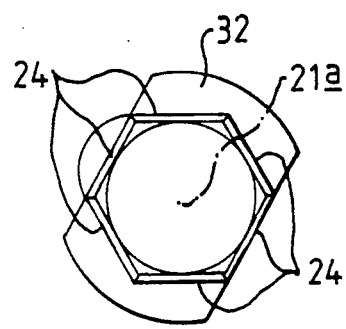
FIG. 4 is a front elevation of the stub spindle of FIG. 3.
Figure 5:
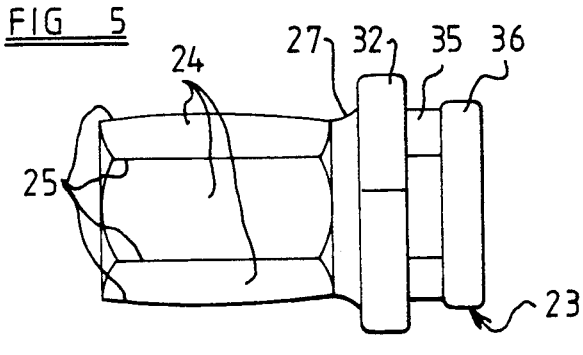
FIG. 5 is a plan view of the stub spindle of FIG. 3.
Figure 6:
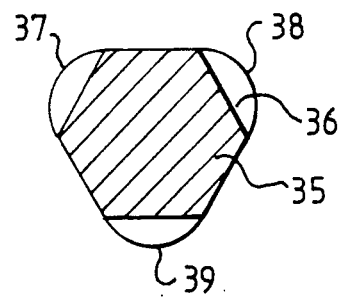
FIG. 6 is a cross section taken on the lines A—A of FIG. 3, and, FIG. 7 is a rear elevation of the stub spindle of FIG. 3.
Figure 7:
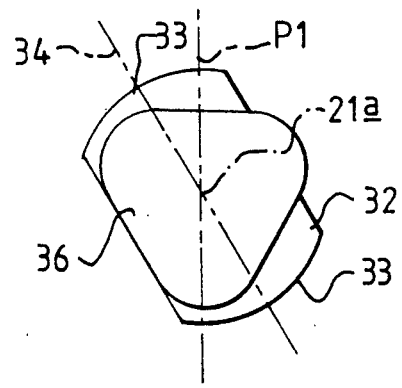

A cross section taken on the line X—X in FIG. 3 through the end portion 22 at a position of maximum dimension of the end portion 22 is of a dimension so as to be a good fit in the socket 19 of the roller 14. Thus the barrel shaped end portion 22 has a central supporting zone which contacts the internal surface of the socket 19 whilst the remaining or relieved zones of the end portion 22 are radially closer to the axis 21 and thus normally do not contact the internal surface of the socket 19, that is, when the longitudinal axes 21a of the end portions 22 coincide with the longitudinal axis 21 of the roller 14.

Accordingly a limited amount of misalignment between the longitudinal axis 21a of the end portion 22 of each stub spindle 20 and the longitudinal axis 21 of the roller 14 can take place so that a roller 14 mounted on two stub spindles 20 is self aligning within limits permitted by the shapes of the end portions 22 and a degree of misalignment between the longitudinal axes 21a of the respective stub spindles 20 can be tolerated without an acceptable increase in the frictional resistance to rotation of the roller 14 or other deliterous effect.

Although in the present example the barrel shaped end portion 22 is hexagonal in cross section, if desired it may be of another shape in cross section preferably to co-operate with a socket 19 of corresponding configuration so as to prevent relative rotation therebetween. For example, the end portion 22 may be octagonal or square in cross section or may be of any other desired polygonal shape.

Further alternatively each intersecting surface 25 may be curved in a radial plane normal to the longitudinal axis 21a of the end portion 22 and the curvature may be convex or concave, but preferably in all cases the end portion 22 is barrel shaped, that is to say there is a medial zone of greatest cross sectional dimension bounded by lateral zones of progressively decreasing cross sectional dimension. Generally the portions of the surface of maximum cross sectional dimension of any particular cross section may lie on a conceptual enveloping surface which is of generally prolate spheroidal shape.

The support portions 23 each comprise a flange 32 which is connected to neck 27, an intermediate portion 35 and a retaining part 36.

The flange 32 is generally rectangular in cross section, but the ends of the flange indicated at 33 are curved. A central plane of the flange 32 which is indicated at 34, is set at an angle of approximately 30° to a generally vertical plane P1 each plane 34, P1, containing the longitudinal axis 21a of the end portion 22.

The intermediate portion 35 is hexagonal in shape whilst the retaining part 36 is generally triangular, but each apex 37, 38 and 39 of the triangle, is rounded.

Each side member 11 of the conveyor provides a plurality of mounting means for mounting the rollers 14 in spaced generally parallel relation along the conveyor. Each mounting means comprises an opening 40 which corresponds in shape to the retaining part 36 of the support portions 23 of the stub spindles 20. The openings 40 are arranged in the side flange 13 with an apex 41 pointing generally upwardly. Like the generally triangular shape of the retaining part 36, each of the apices 41, 42 and 43 of the opening 40 are rounded. The openings 40 is dimensioned so as to be only slightly larger than the retaining parts 36 of the support portions 23.

It will be appreciated that the retaining part 36 of a stub spindle 20, prior to the end portion 22 being received in a socket 19 of a roller 14, can be received in the opening 40 in the side frame member 11, when the retaining part 36 is orientated similarly to the opening 40 i.e. with an apex 37 of the retaining part 36 pointing generally upwardly, by moving the stub spindle 22, in a direction away from a centre line of the conveyor, generally along the axis 21a of the end portion 22, until the flange 32 abuts the inside surface of the upright 13. It will be appreciated that the flange 32 is too large to pass through the opening 40 in any orientation of the stub spindle 20.

Figure 2:
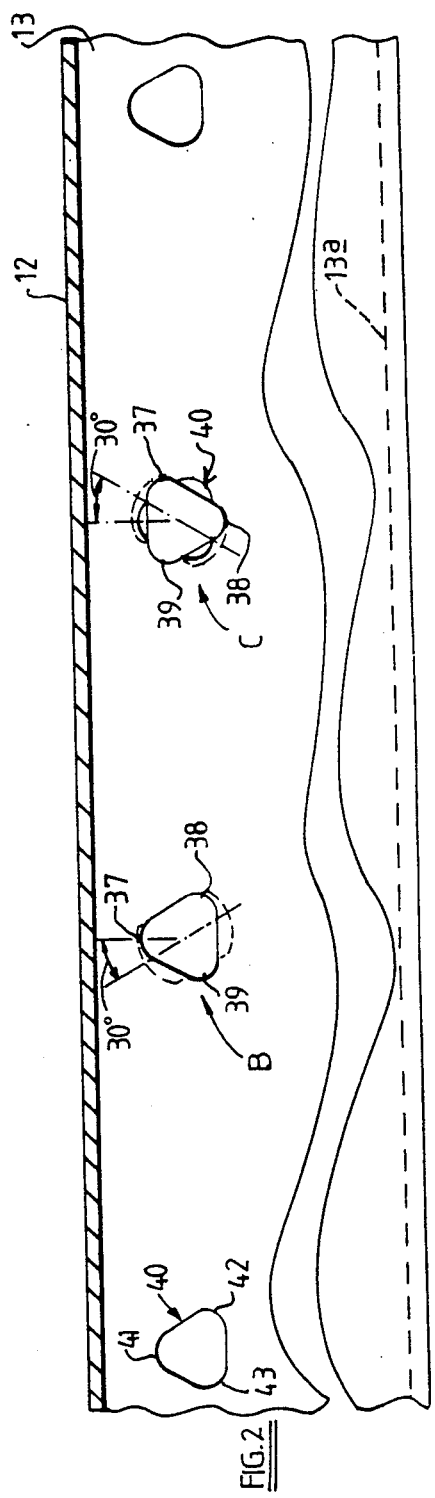
FIG. 2 is a side view with parts omitted of parts of the conveyor of FIG. 1, again partly in cross section.

The condition of the stub spindle 20 once the retaining part 36 has been inserted into the opening 40 is shown at position B in FIG. 2.

The stub spindle 20 can be locked in position by changing the orientation of the stub spindle from one in which the retaining part 36 can be passed through the opening 40, to a second orientation where the retaining part 36 is prevented from being withdrawn from the opening 40 by moving the stub spindle 20 along the axis 21a.

By rotating the stub spindle 20 through 60°, it can be seen that the apex 39 of the retaining part 36 then points downwardly and overlaps the bottom edge of the triangle of the opening 40, whilst the remaining apices 37 and 38 also overlap respective sides of the triangle 40.

The stub spindle 20 in this position is shown at C in FIG. 2.

Such volitive rotation is permitted because of the material from which the intermediate portion 35 is made, which yields sufficiently to enable the stub spindle to be rotated, and regains at least sufficient of its shape to engage with the sides of the opening 40 to prevent the stub spindle, in use, rotating relative to the side member 11.

It will be appreciated therefore that the stub spindle 20 can be received and mounted in the opening 40 in the side frame member 11 by moving the stub spindle 20 longitudinally from a position between the side frame members 1, and then rotating it.

Referring now to FIGS. 8a to 8d, the method whereby the roller 14 can then be mounted with respect to the already mounted first stub spindle 20, and a further stub spindle 20′ similarly constructed to stub spindle 20, is illustrated.

The stub spindle 20′ is inserted into the respective socket 19′ in the respective end of the roller 14 as indicated in FIG. 8a. Then the roller 14 is manouvred so as to engage the already mounted stub spindle 20 within the socket 19 at the other end of the roller 14.

Such manouvre is permitted because of the barrel shape of the end portion 22, and the construction of the bearing means 15. It can be seen that the longitudinal axis 21 of the roller 14 needs to be inclined relative to the longitudinal axis 21a of the end portion 22 by about 30° only because the openings 40 of the side frame members 11, are provided towards the top flanges 12 of the side frame members 11. This is illustrated in FIG. 8b.

As indicated in FIG. 8c, the end portion 22 is inserted further into the socket 19 than the position it will in use occupy, so as to give sufficient clearance for the end of the roller 14 in which spindle 20 is mounted to be lowered so as to bring the retaining part 36' of the stub spindle 20' into alignment with the opening 40 provided in the respective other side frame member 11. Hence by moving the roller 14 longitudinally, away from stub spindle 20, the retaining part 36' of stub spindle 20' can be passed through the respective opening 40 in the side frame member 11, provided that the stub spindle 20' is orientated so that the retaining part 36' is aligned with the opening 40. Once the retaining part 36' has been inserted through the opening 40 to bring flange 32' into abutment with upright 13 of the side frame member 11, the stub spindle 20' can be rotated through 60° as already described with reference to the first mentioned stub spindle 20 so as to retain the stub spindle 20' in position.

This is indicated in FIG. 8d.

It will be appreciated that in both cases, once the stub spindles 20, 20' have been moved to their second orientations, relative rotation between the stub spindle 20, 20' and the respective side frame member 11 will be prevented as will relative rotation between the stub spindle 20, 20' and the respective inner bearing race 18b of the bearing means 15. However, the roller 14 will be free to rotate by virtue of the bearing means 15.

Although as described, the openings 40 in the side frame members 11 have been described as being generally triangular, and the intermediate portions 35 of the support portions 23 are described as being hexagonal, other configurations are possible. However, the present invention has the advantage that a common conveyor frame can be used either to mount rollers 14 on stub spindles 20, 20' as hereinbefore described, or on conventional spindles which extend from one side member 11 to the other, which spindles are generally hexagonal in cross section at least at their ends, which spindles are received by the openings 40 in exactly the same manner that the intermediate portions 35 of the stub spindles 20 are received.

Instead of the stub spindle 20 being made in one piece with the intermediate portions 35 being of nylon or like material, the stub spindles 20 may be fabricated, and the intermediate portion may be configured so as to deform sufficiently to permit rotation of the stub spindles 20 to change the orientations of the stub spindles, and then regain at least sufficient of their original configuration to engage with the sides of the openings 40.

Any other suitably shaped retaining parts 36, 36' and openings 40 may be provided to enable the stub spindles 20, 20' to be retained in engagement with the end members 11 as hereinbefore described.

If desired, all of the rollers 14 of the conveyor 10 may be mounted as described, by stub spindles 20, 20', although if desired, at least some of the rollers 14 may be mounted by conventional spindles.

Further, if desired, only one end of one of the rollers may be mounted by a stub spindle 20 as described, the other end of the roller being mounted by for example, a stub spindle receivable in an open topped slot in the respective side member 11, for example, as described in previous U.S. Pat. No. 2 101 061 by movement of the roller 14 when in the position shown in FIG. 8b only in a direction transverse to axis 21a of the stub spindle 20.

If desired the axial position of the flange 32 and retaining part 36 on the stub spindle may be reversed, in which case the stub spindle 20 is engageable with a mounting means 40 from a position outside the side frame members by moving the stub spindle towards a centre line of the conveyor.

The features disclosed in the foregoing description or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A conveyor apparatus comprising a conveyor having a conveyor frame comprising a pair of spaced side members each having a plurality of mounting means to mount a plurality of rollers in spaced relation between the side members, the conveyor further comprising a plurality of rollers mounted between the side members, each roller being provided with a bearing means having a socket, the rollers being mounted in spaced relation between the pair of side members on spindle means which are carried by the mounting means and which are provided with a portion which extends within the socket to permit each roller to rotate about a roller axis, wherein the spindle means of at least one of the rollers comprises a pair of stub spindles each having a generally elongate end portion which in use, extends within a socket provided at one end of said at least one roller, and a support portion which inter-engages with an opening of a respective side frame member of the conveyor frame which provides a mounting means for said at least one roller, the support portion of at least one of the stub spindles comprising a retaining part and a flange with an intermediate portion between the retaining part and the flange, and said opening being configured such that with the stub spindle in a first orientation the retaining part of the support portion can be inserted into the opening by moving the stub spindle along the longitudinal axis of the end portion, and when the orientation of the stub spindle is changed to a second orientation, the retaining part of the support portion is prevented from being withdrawn from the opening by an opposite movement of the stub spindle and the flange is configured such that the flange cannot pass into the opening in the respective side frame member with a stub spindle in either of the first and second orientations, and the intermediate portion and the opening co-operate to prevent translational movement between the stub spindle and the side member and to prevent, in use, relative rotation between the stub spindle and the side member.

2. A conveyor apparatus according to claim 1 wherein the opening has a plurality of sides and the intermediate portion of the support portion has a pair of sides which co-operate with at least some of the sides of the opening to prevent relative rotation between the stub spindle and the side member when in use.

3. A conveyor apparatus according to claim 2 wherein the intermediate portion is generally hexogonal in cross section.

4. A conveyor apparatus according to claim 3 wherein the opening in the side member is generally triangular with an apex of the traingle pointing generally upwardly.

5. A. conveyor apparatus according to claim 4 wherein the apices of the triangle are rounded.

6. A conveyor apparatus according to claim 1 wherein to change the orientation of the stub spindle from the first to the second orientation, the stub spindle is rotated through less than 360°.

7. A conveyor apparatus according to claim 1 wherein at least the intermediate portion of the stub spindle is made of a material which yields, and is in a configuration such that the intermediate portion deforms sufficiently to permit volitive rotation relative to the opening in the side member, and then regains its shape at least sufficiently to co-operate with the opening to prevent relative rotation, in use.

8. A conveyor apparatus according to claim 1 wherein the end portion of the stub spindle and the associated socket of the roller are adapted to inter-engage to prevent relative rotation therebetween.

9. A conveyor apparatus according to claim 8 wherein the end portion of the stub spindle is polygonal in cross section over at least part of its length and the socket of the roller is generally prism shaped having a cross section which corresponds to the maximum cross section of the end portion or polygonal part of the end portion.

10. A conveyor apparatus according to claim 9 wherein the end portion is generally hexogonal in cross section.

11. A conveyor apparatus according to claim 8 wherein the end portion is generally barrel shaped, as hereindefined.

12. A conveyor apparatus according to claim 1 wherein both of the stub spindles of the roller and their associated openings in the pair of side frame members are similarly constructed.

13. A conveyor apparatus comprising a conveyor frame comprising a pair of spaced side members each having a plurality of mounting means to mount a plurality of rollers in spaced relation between the side members, the conveyor apparatus further comprising a plurality of rollers mounted between the side members, each roller being provided with a bearing means having a socket, the rollers being mounted in spaced relation between the pair of side members on spindle means which are carried by the mounting means and which are provided with a portion which extends within the socket and to permit each roller to rotate about a roller axis, and (a) a first plurality of rollers each having a bearing means providing a socket at each end, a pair of stub spindles for each roller of said first plurality, each stub spindle having an end portion which is adapted to extend within an associated socket to inter-engage therewith and a support portion adapted to inter-engage with a mounting means of an associated frame member to inter-engage therewith to prevent relative rotation therebetween, at least one of the stub spindles comprising a retaining part and a flange with an intermediate portion between the retaining part and the flange, and said opening being configured such that with the stub spindle in a first orientation a retaining part of the support portion can be inserted into the opening by moving the stub spindle along the longitudinal axis of the end portion, and when the orientation of the stub spindle is changed to a second orientation, the retaining part of the support portion is prevented from being withdrawn from the opening by an opposite movement of the stub spindle and the flange is configured such that the flange cannot pass into the opening in the respective side member with the stub spindle in either of the first and second orientations, and the intermediate portion and the opening co-operate to prevent translational movement between the stub spindle and the side member and to prevent, in use, relative rotation between the stub spindle and the side member;

(b) a second plurality of rollers each having a bearing means providing a socket, an elongate spindle element for each roller of said second plurality, each spindle element having a portion which is adpated to extend within an associated socket to inter-engage therewith and, at opposite ends, support portions adapted to inter-engage with the same mounting means as are inter-engageable with said support portions of the stub spindles, to inter-engage with said mounting means to prevent relative rotation therebetween, in use.

14. A method of making a conveyor apparatus comprising a conveyor having a conveyor frame comprising a pair of spaced side members each having a plurality of mounting means to mount a plurality of rollers in spaced relation between the side members, the conveyor further comprising a plurality of rollers mounted between the side members, each roller being provided with a bearing means having a socket, the rollers being mounted in spaced relation between the pair of side members on spindle means which are carried by the mounting means and which are provided with a portion which extends within the socket to permit each roller to rotate about a roller axis, wherein the spindle means of at least one of the rollers comprises a pair of stub spindles each having a generally elongate end portion which in use, extends within a socket provided at one end of said at least one roller, and a support portion which inter-engages with an opening of a respective side frame member of the conveyor frame which provides a mounting means for said at least one roller, the support portion of at least one of the stub spindles comprising a retaining part and a flange with an intermediate portion between the retaining part and the flange, and said opening being configured such that with the stub spindle in a first orientation the retaining part of the support portion can be inserted into the opening by moving the stub spindle along the longitudinal axis of the end portion, and when the orientation of the stub spindle is changed to a second orientation, the retaining part of the support portion is prevented from being withdrawn from the opening by an opposite movement of the stub spindle and the flange is configured such that the flange cannot pass into the opening in the respective side member with the stub spindle in either of the first and second orientations, and the intermediate portion and the opening co-operate to prevent translational movement between the stub spindle and the side member and to prevent, in use, relative rotation between the stub spindle and the side member comprising the steps of:

taking the conveyor frame and the pair of stub spindles;

inserting the retaining part of the support portion of the at least one stub spindle into the corresponding opening of the side frame member, by moving the stub spindle along the longitudinal axis of the end portion thereof with the stub spindle in said first orientation; and changing the orientation of the stub spindle to said second orientation.

15. A method according to claim 14 wherein the method includes the step of inserting the second of the stub spindles into the respective other socket in the end of the roller, and manoeuvring the roller so as to inter-engage the first mentioned socket and the stub spindle which is already mounted with respect to the conveyor frame, and inter-engaging the support portion of the second of the stub spindles and the mounting means of the other side frame member.

16. A method according to claim 14 wherein the mounting means of the other side frame member comprises an opening and the second of the stub spindles is aligned with the opening of the other sub frame member and the roller moved longitudinally away from the first of the stub spindles so as to engage the support portion of the second of the stub spindles in the opening, to mount the second end of the roller in the conveyor frame.

* * * * *